United States Patent Office 3,706,773
Patented Dec. 19, 1972

3,706,773
FLUOROCARBON COMPOUNDS
Louis Gene Anello, Basking Ridge, and Richard Francis Sweeney, Randolph Township, Morris County, N.J., and Morton Herbert Litt, Cleveland, Ohio, assignors to Allied Chemical Corporation, New York, N.Y.
No Drawing. Continuation-in-part of application Ser. No. 633,359, Apr. 25, 1967. This application Apr. 12, 1968, Ser. No. 721,117
The portion of the term of the patent subsequent to Oct. 10, 1989, has been disclaimed
Int. Cl. C07c 59/22
U.S. Cl. 260—408   52 Claims

ABSTRACT OF THE DISCLOSURE

Fluorocarbon compounds of the formula

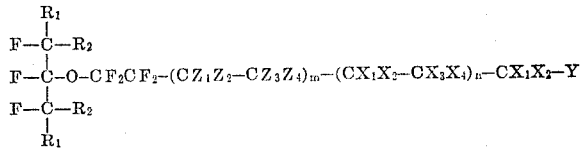

wherein $R_1$ and $R_2$ are F, fluoroalkyl or fluoroalkylene groups forming a cycloaliphatic structure, wherein $$-(CZ_1Z_2-CZ_3Z_4)-$$

and $-(CX_1X_2-CX_3X_4)-$ are bifunctional groups wherein $Z_1-Z_4$ and $X_1-X_4$ are H, F, or Cl, and wherein Y is —CN or

wherein Q represents F, Cl, hydroxy, alkoxy, amino or substituted amino groups are prepared from polyfluoro halides of the formula

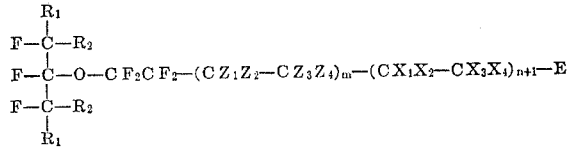

wherein E is a halogen.

The fluorocarbon compounds of the present invention are or can be converted into surface active and stain repellent agents.

CROSS-REFERENCES TO RELATED APPLICATIONS

This application is a continuation-in-part of our copending application Ser. No. 633,359, filed Apr. 25, 1967, entitled "Telomers and Process for the Preparation Thereof," now U.S. Pat. 3,514,487.

Other related applications are:
(1) Copending application of Litt et al., entitled "Fluorinated Ethers," Ser. No. 492,276, filed Oct. 1, 1965, now U.S. Pat. 3,453,333.

(2) Copending application of Litt et al., entitled "Fluorinated Ethers," Ser. No. 513,574, filed Dec. 13, 1965, now U.S. Pat. 3,470,256.

(3) Copending application of Anello et al., entitled "Novel Fluorinated Alcohols," Ser. No. 721,089, filed of even date herewith.

BACKGROUND OF THE INVENTION

This invention relates to novel fluorocarbon acids characterized by a terminal fluoroisoalkoxyalkyl group and to their salts, halides, nitriles, alkyl esters and amides.

It is known that fluorocarbon acids and certain of their derivatives, such as their salts and esters, effectively lower the surface tension of water. It is also known that fluorocarbon acids and certain of their derivatives, such as the amides, are valuable oil and stain repellent agents by virtue of the presence of a reactive group at one end of the molecule, and the presence of a fluorocarbon "tail" having extremely low surface energy at the other end thereof. When the reactive groups of these acids are absorbed on or bonded to a solid surface, the fluorocarbon "tail" protrudes to form a fluorocarbon film having no affinity for either oil or water. We have found a novel class of fluorocarbon acids which have a highly fluorinated terminal branched-chain or cyclic fluoroalkoxy group linked through the ether oxygen to a —$CF_2CF_2$— group which are oil, stain and water repellent agents of unusual activity, and which can be converted into other oil, stain and water repellent agents of unusual activity.

One object of the present invention is the provision of novel fluorocarbon acids.

Another object is the provision of derivatives of these novel fluorocarbon acids.

A further object is the provision of novel fluorocarbon acids and derivatives thereof having surfactant and oil, stain and water repellent properties.

A still further object of the invention is the provision of novel fluorocarbon acids and derivatives thereof which can be employed to prepare superior surfactants and superior oil, stain, and water repellent compositions.

SUMMARY OF THE INVENTION

The novel fluorocarbon compounds of the present invention are represented by the general formula

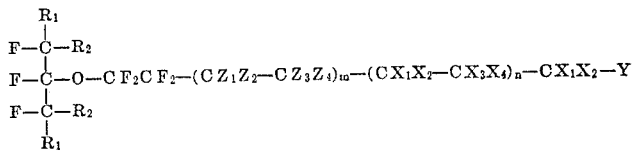

(I)

wherein (a) $R_1$ and $R_2$ are F or fluoroalkyl groups, or when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups, (b) $-(CZ_1Z_2-CZ_3Z_4)-$ is a bifunctional group wherein $Z_1$, $Z_2$, $Z_3$ and $Z_4$ are independently selected from the group consisting of H, F and Cl, provided $Z_1-Z_4$ do not include more than two chlorine atoms, (c) $-(CX_1X_2-CX_3X_4)-$ is a bifunctional group wherein $X_1$, $X_2$, $X_3$ and $X_4$ are independently selected from the group consisting of H, F and Cl, provided $X_1-X_4$ do not include more than one chlorine atom, and provided further that $X_3$ and $X_4$ do not include, in combination, H and one halogen atom, (d) $m$ and $n$ are each integers of from 0 to about 20, with the proviso that the sum of $m$ and $n$ is from 1 to about 20, (e) —$CX_1X_2$— is a bifunctional group wherein $X_1$ and $X_2$ are indepedently selected from the group consisting of H, F and Cl, except that $X_1$ and $X_2$ may not both be Cl, and provided that when $n$ is greater than 0, $X_1$ and $X_2$ are the same as $X_1$ and $X_2$ in bifunctional group —$(CX_1X_2—CX_3X_4)$—, and (f) Y is a member selected from the group consisting of radicals of the formulae —CN and

wherein Q is a substituent selected from the group consisting of (i) —OA, wherein A is selected from the group consisting of hydrogen and the alkali metals, (ii) hal, wherein hal is a halogen selected from the group consisting of F and Cl, (iii) —O—$C_qH_{2q+1}$, wherein $q$ is an integer from 1 to 6, and (iv) —NHB, wherein B is selected from the group consisting of H, —$C_qH_{2q+1}$, —$C_qH_{2q}$—OH and —$C_qH_{2q}Cl$, wherein $q$ is an integer from 1 to 6.

The novel compounds of this invention can be prepared by various hereinafter described methods from telomers having the general formula

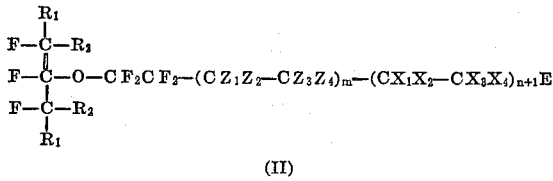

(II)

wherein $R_1$, $R_2$, —$(CZ_1Z_2$—$CZ_3Z_4)$—,

—$(CX_1X_2$—$CX_3X_4)$—

$m$ and $n$ have the aforestated meanings, and wherein E is a halogen selected from the group consisting of Br and I. Telomers of that type and their preparation are described in detail in commonly assigned copending application of Anello et al., entitled "Telomers and Process For the Preparation Thereof," Ser. No. 633,359, filed Apr. 25, 1967, now U.S. Patents 3,453,333 and 3,470,256 respectively, of which the present application is a continuation-in-part. By way of general description, these telomers are prepared by radical addition reactions of polyhaloisoalkoxyalkyl halide telogens of the formula

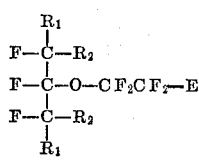

wherein $R_1$, $R_2$ and E have the aforestated meanings, with telomerizable unsaturated compounds. The telomerization reaction may be initiated by heat or by means of a free radical initiating catalyst. The polyhaloisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine and an olefin. Preparation of the telogen starting materials is described in detail in copending applications of Litt et al., "Fluorinated Ethers," U.S. Ser. Nos. 492,276 and 513,574, filed Oct. 1, 1965, and Dec. 13, 1965, respectively, now U.S. Pats. 3,453,333 and 3,470,256 respectively, the pertinent subject matter of which patents is hereby incorporated by reference.

The criticality in the molecule of the novel compounds of the present invention is in the structure of the fluoroisoalkoxyalkyl portion of the molecule. This portion of the mlecule is critically characterized by the presence of an oxygen atom simultaneously linked to (a) a carton atom linked to a fluorine atom as well as to two fluoroalkyl groups, and (b) a —$CF_2$—$CF_2$— group. The fluoroalkyl groups are characterized by the presence of at least one fluorine atom on each carbon atom adjacent to the carbon linked to the oxygen atom. The fluoroalkyl groups may, when taken together, form a cycloaliphatic structure.

Fluorocarbon acids of this invention wherein $n$ is an integer of from 1 to about 20, and wherein $X_3$ and $X_4$ are both H can be prepared by reacting the corresponding telomer halides represented by General Formula II above with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid, as shown below. In the following description $R_f$ stands for the

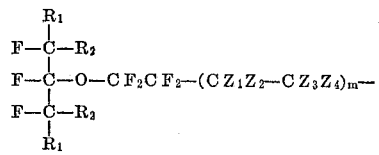

moiety.

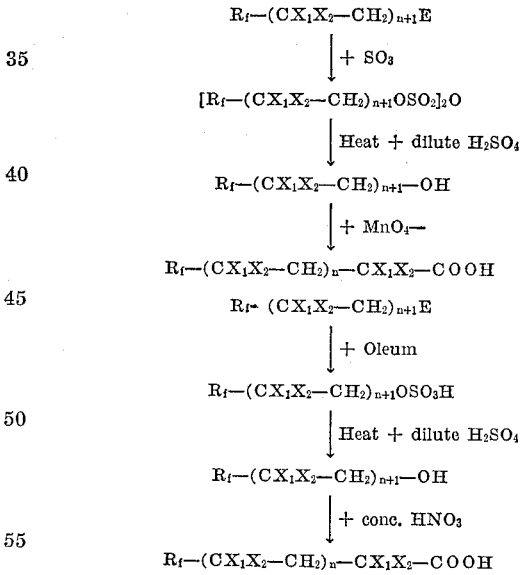

Preparation of the precursor alcohols is described in detail in our copending application Ser. No. 721,089 entitled "Novel Fluorinated Alcohols," filed of even date herewith, the pertinent subject matter of which application is hereby incorporated by reference. Oxidation of the precursor alcohols to form the acids of the present invention follows conventional procedures. Oxidation of the alcohols with nitric acid, preferably in the presence of small amounts of $V_2O_5$ at catalyst, is a preferred method.

Fluorocarbon acids of this invention wherein $n$ is 0 and $X_1$ and $X_2$ are independently selected from the group consisting of H, F and Cl, provided only one of $X_1$ and $X_2$ is Cl or H, can be prepared by the above-described methods from corresponding telomer halides represented by General Formula II above wherein $n$ is 1 and $X_3$ and $X_4$ are both H.

Fluorocarbon acids of this invention wherein $n$ is 0, and wherein $X_1$ and $X_2$ are both H and wherein the carbon atom in $\beta$-position to the carboxyl carbon carries two fluorine atoms can be prepared by oxidation of the terminal ethylenically unsaturated group of fluoroolefins having the formula

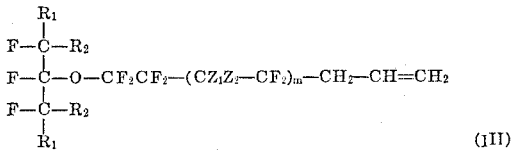

(III)

wherein $R_1$, $R_2$, $Z_1$, $X_2$ and $m$ have the aforestated meanings. Oxidation of the terminal group may be conventionally effected by treatment with oxidizing agents such as potassium permanganate or dichromate. The fluoroolefins of Formula III above may be prepared from corresponding telomer halides of Formula II above wherein $n$ is 0 and E is iodine by reaction with allyl alcohol at temperatures between about 100°–450° C., preferably at temperatures between 150°–300° C., under superatmospheric reaction pressures, according to the equation.

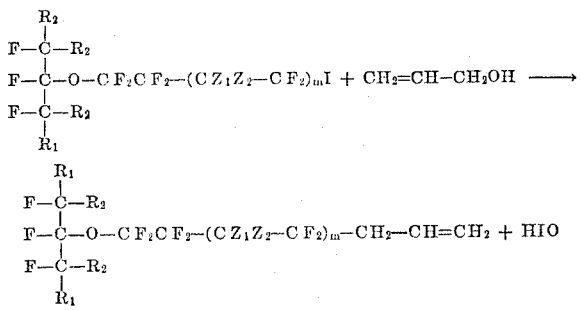

Fluorocarbon acids of this invention wherein $n$ is an integer of from 1 to about 75, and wherein $X_3$ and $X_4$ are both F or are F and Cl, respectively, can be prepared by reacting a corresponding telomer halide represented by Formula II above with $SO_3$ to form acid halides and pyrosulfuryl halides, and hydrolyzing the pyrosulfuryl halides and acid halides by refluxing with water to obtain the corresponding free acids, as shown below:

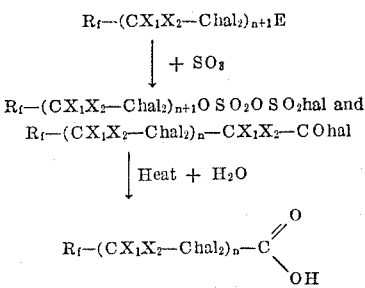

The reaction of the telomer halide with sulfur trioxide to yield the intermediary acid halide and pyrosulfuryl halide should be carried out at temperatures between about 50°–175° C., preferably between about 100°–150° C. The molar ratio of sulfur trioxide to telomer halide should be at least about 1:1, but preferably a molar ratio of about 2:1 to 10:1 should be employed. The reaction should be carried out under such pressure as is sufficient to maintain the reactants in liquid phase. Depending on the volatility of the particular telomer halide employed and the concentration of sulfur trioxide, suitable pressures may range between about 25–500 p.s.i.g. The higher the molecular weight of the telomer halide, the more difficult it is to convert to the acid halide and pyrosulfuryl halide. In general, the higher molecular weight telomer halides require longer reaction times and higher reaction temperatures.

The sulfur trioxide reagent may be added in any physical state but is preferably added in liquid form. Technical grade stabilized, liquid sulfur trioxide, commercially available under the trademark Sulfan, is convenient and well suited for use.

The reaction of the telomer halides with sulfur trioxide generally yields a mixture of the corresponding acid halides and pyrosulfuryl halides, contaminated by unreacted starting material and, sometimes, small amounts of the corresponding free acids. The sought-for acid halides and pyrosulfuryl halides may be separated from the product mixture by conventional methods, as e.g. fractional distillation. The acid halides and pyrosulfuryl halides may be hydrolyzed to the corresponding acid salts with an aqueous base such as, for example, potassium hydroxide or sodium hydroxide. The acid salts exhibit unusually high surface active properties and may be used in the manner in which surfactants are conventionally employed, such as in the preparation of emulsions and surface coatings and to increase wettability such as in the dyeing of textile fabrics. From these salts the free acids may be generated by acidification with aqueous mineral acids such as hydrochloric, sulfuric or phosphoric acids.

The acid halides and pyrosulfuryl halides may also be reacted with an alkanol, at temperatures in the range of about 0–25° C., to form the corresponding ester. The esters are particularly desirable intermediates for reaction with amines to give amide derivatives. Hydrolysis of the esters in conventional manner yields the free acids.

All of the alkyl esters of acids of the present invention having the Formula I above wherein Y is

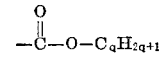

wherein $q$ has the aforestated meaning may be prepared by esterification of the acids with the corresponding alkyl alcohols. The esterification reaction is conventional and may optionally be conducted in the presence of an esterification catalyst.

Hydrolysis of the alkyl esters or neutralization of the free acids with alkali metal hydroxides yields the alkali metal salts of the acids of the present invention. The salts react with mineral acids to form the corresponding fluorocarbon acids.

Amides of the acids of the present invention which have the Formula I above wherein Y is

wherein Q represents $-NH_2$, $-NH-C_qH_{2q+1}$, and $$-NH-C_qH_{2q}-OH$$

wherein $q$ has the meaning given above may be prepared in conventional manner by reacting the corresponding alkyl ester with ammonia or the corresponding primary alkyl or hyroxyalkyl amine. Amides of acids of the present invention wherein the bifunctional groups $$-(CX_1X_2-CX_3X_4)-$$

and $-CX_1X_2-$ are $-CH_2-CH_2-$ and $-CH_2-$, respectively, are preferably prepared by reacting the corresponding acid chloride with ammonia or the corresponding primary alkyl or hydroxyalkyl amine.

Substituted amides of the present invention which have the Formula I above wherein Y is

wherein Q represents $-NH-C_qH_{2q}Cl$ wherein $q$ has the meaning given above may be prepared from the corresponding hydroxyamides by treatment with thionyl chloride, preferably at temperatures between about 50° C. and about 110° C. The reaction proceeds in the presence or absence of a solvent. Those substituted amides represented by Formula I above wherein Y is

may also be prepared by reacting the corresponding acid chloride wherein Y is

with ethyleneimine, preferably in the presence of an inert solvent, such as ethyl ether. The reaction proceeds readily at room temperature; elevated temperatures may be employed if desired. The amides and substituted amides of the present invention are oil, stain and water repellent agents of unusual activity.

The acid halides of the present invention represented by Formula I above wherein Y is

may be prepared in conventional manner by reacting the corresponding carboxylic acid wherein Y is

with thionyl chloride, benzoyl trichloride or $PCl_5$, preferably in the presence of an inert organic solvent, such as chloroform. Those acid halides of the present invention wherein Y is

may be prepared by reacting the corresponding acid chloride with potassium fluoride in the presence of a polar organic solvent such as acetonitrile or dimethyl formamide. The reactions proceed readily at room temperature; elevated temperatures may be employed, if desired.

The nitriles of the present invention can be prepared from the fluorocarbon acids of this invention by first forming the ester, converting the ester to the amide, and subsequently dehydrating the amide, using $P_2O_5$, to the nitrile.

The hereinabove described methods for making the invention compounds starting with telomer halides represented by Formula II above are not part of the instant invention.

Other methods for preparing the fluorocarbon compounds of the present invention from telomers of Formula II above will readily occur to those skilled in the art.

DESCRIPTION OF THE PREFERRED EMBODIMENTS

With reference to Formula I above for the novel fluorocarbon compounds of the present invention, $R_1$ and $R_2$ are preferably F or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

Specific examples of preferred embodiments of the

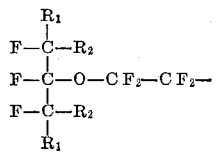

moiety in Formula I include the following:

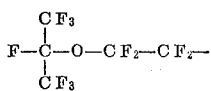
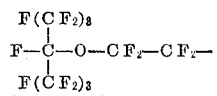

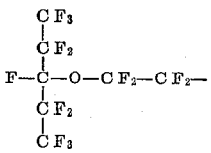
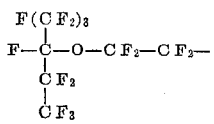

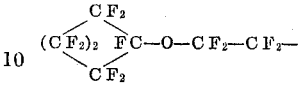
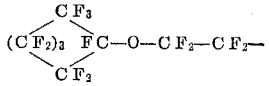

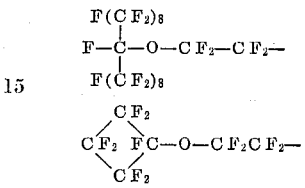
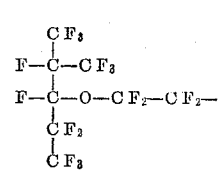

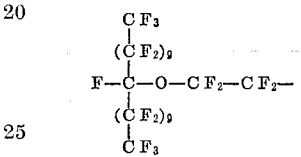
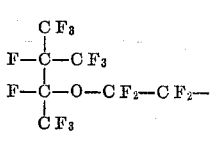

Preferred embodiments of the bifunctional group $$-(CZ_1Z_2-CZ_3Z_4)-$$

of Formula I above are represented by the groups $$-CF_2-CF_2, \quad -CH_2-CF_2-, \quad -CF_2-CFCl-$$

and $$-CH_2-CH_2-$$

the group $-CF_2-CF_2-$ being most preferred.

Preferred embodiments of the bifunctional group $$-(CX_1X_2-CX_3X_4)-$$

of Formula I above are represented by the groups $$-CF_2-CF_2-, \quad -CH_2-CF_2-, \text{ and } -CH_2-CH_2-$$

groups $-CH_2-CH_2-$ and $-CF_2-CF_2-$ being most preferred.

Preferred specific embodiments of the present invention are fluorocarbon compounds according to Formula I above having the formulas

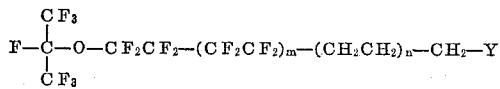

and

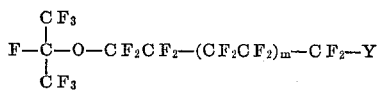

wherein Y has the meaning given above and wherein the sum of $m$ and $n$ is from 1 to about 20, still preferably from 1 to about 10.

The following examples further illustrate the present invention, but are not intended to be a limitation thereon.

EXAMPLE 1

Preparation of $(CF_3)_2CFO-CF_2CF_2-CH_2CH_2-OH$

A three-necked 250 ml. flask, fitted with a stirrer, dropping funnel, thermometer and condenser leading to a trap at $-78°$ C. was charged with 38 grams (0.086 mol) of heptafluoroisopropoxy tetrafluorobutyl iodide

B.P. 85–97°/100 mm. Then 0.344 mol of stabilized sulfur trioxide was added slowly to the heptafluoroisopropoxy tetrafluorobutyl iodide maintaining the reaction temperature at 35°–40° C. Reaction occurred immediately, liberating iodine. After addition of $SO_3$ was complete, the mixture was heated to 70° C. for a period of 2 hours to complete formation of the pyrosulfate. Then the mixture was cooled to room temperature (ca. 25° C.), and 100 ml. of 35% $H_2SO_4$ was added slowly to hydrolyze the pyrosulfate intermediate $$[(CF_3)_2CFOCF_2CF_2CH_2CH_2OSO_2]_2$$

to the alcohol. A small amount (10 grams) of $Na_2SO_3$ was added to remove elemental iodine. The mixture was then maintained at 105° C. for 1 hour to complete the hydrolysis of the intermediate to the corresponding alcohol. The mixture was then allowed to cool to room temperature, aqueous and organic phases were separated, the aqueous phase was extracted with ether, and the combined organic phase and ethereal extract were subjected to fractional distillation under reduced pressure. The principal component obtained was identified as 3,3,3-tetrafluoro-4-heptafluoroisopropoxy butanol $$(CF_3)_2CFOCF_2CF_2CH_2CH_2OH$$

of which 19 grams, 0.060 mol representing a 70% yield, was recovered and had a boiling point of 84° C./59 mm.

EXAMPLE 2

Preparation of $(CF_3)_2CFO—CF_2CF_2—$
$CF_2CF_2—CH_2CH_2—OH$

Into a two liter, 3-necked flask equipped with heater, stirrer, dropping funnel, thermometer and condenser vented to traps, was charged 200 grams of 20% oleum. The flask was heated to 90° C. and 100 grams (0.185 mol) of $(CF_3)_2CFO—CF_2CF_2—CF_2CF_2—CH_2CH_2$ was added over a 15 minute period while maintaining the mixture at 90°–100° C. The reaction mixture was stirred at 100° C. for an additional hour, then cooled to 20° C. in an ice bath. Then 840 grams of water was added slowly, the temperature rising to 70° C. The mixture was heated to 100° and maintained at that temperature for 16 hours. The mixture was washed with $Na_2S_2O_5$ to reduce elemental iodine, the resulting water-insoluble oil was separated, dried and distilled, yielding 50.2 grams (0.117 mol) of 3,3,4,4,5,5,6,6-octafluoro - 6 - heptafluoroisopropoxy hexanol $(CF_3)_2CFO—CF_2CF_2CF_2CF_2CH_2CH_2OH$, boiling at 63° C./4 mm., corresponding to a conversion of 63%, yield of 63%.

Analysis showed: Theoretical (percent): C, 25.12; F, 66.28; H, 1.16. Found (percent): C, 24.48; F, 66.41; H, 1.21.

EXAMPLE 3

Preparation of $(CF_3)_2CFO—CF_2CF_2—$
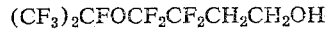
$(CH_2CH_2)_{10}—CH_2—COOH$

A 250 ml. three-necked flask equipped with stirrer, reflux condenser and thermometer is charged with 35 g. of $(CF_3)_2CFO—CF_2CF_2—(CH_2CH_2)_{11}OH$ and 10 g. of potassium dichromate in 30 g. of conc. sulfuric acid. Under vigorous agitation the mixture is heated to 100° C. for a period of 4 hours. The mixture is then allowed to cool to room temperature, is drowned in 200 ml. of ice water, and the crude acid $$(CF_3)_2CFO—CF_2CF_2—(CH_2CH_2)_{10}—CH_2—COOH$$

is recovered by filtration.

EXAMPLE 4

Preparation of $(CF_3)_2CFO—CF_2CF_2—$
$(CF_2CF_2)_3—CH_2CH_2—COOH$

A 250 ml. three-necked flask equipped with stirrer, thermometer and reflux condenser is charged with 50 g. of $(CF_3)_2CFO—CF_2CF_2—(CF_2CF_2)_3—(CH_2CH_2)_2OH$ and 20 g. of conc. nitric acid. A pinch of vanadium pentoxide is added as a catalyst and the mixture is heated to 90° C. and is maintained at that temperature under vigorous agitation for a period of 5 hours. The mixture is then allowed to cool to room temperaure, is drowned in 200 ml. of water, aqueous and organic phases are separated, the aqueous phase is twice extracted with ether, aqueous phase and ethereal extracts are combined, dried over anhydrous sodium sulfate, and subjected to fractional distillation under reduced pressure to obtain the acid $(CF_3)_2CFO—CF_2CF_2—(CF_2CF_2)_3—$
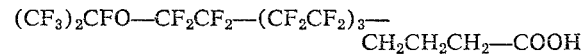
$CH_2CH_2CH_2—COOH$ as distillate.

EXAMPLE 5

Preparation of $(CF_3)_2CFO—CF_2CF_2—CH_2CH=CH_2$

A stainless steel autoclave of 300 ml. capacity was charged with 150 g. (0.38 mol) of $$(CF_3)_2CFO—CF_2CF_2I$$

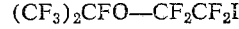
B.P. 86°–87° C., and 35 g. (0.6 mol) of allyl alcohol. The autoclave was evacuated, sealed to the atmosphere, placed in a mechanical shaker, and its contents, under constant shaking, were heated to 200° C. by means of external electrical heaters, and were maintained under these conditions for a period of 18 hours. Thereafter autoclave and contents were allowed to cool to room temperature, the autoclave was vented, and the liquid reaction product was taken up in 150 ml. of methylene chloride. There was obtained a dark, turbid solution which was filtered to remove insoluble carbonaceous contaminants. The clear filtrate was subjected to fractional distillation under atmospheric pressure. After the more volatile methylene chloride was distilled off there was obtained as distillate a main fraction of 32.5 g. (0.1 mol) of the liquid product $$(CF_3)_2CFO—CF_2CF_2—CH_2—CH=CH_2$$

in 41 percent yield, boiling at 95°–96° C. at atmospheric pressure.

EXAMPLE 6

Preparation of $(CF_3)_2CFO—CF_2CF_2—CH_2—COOH$

A 250 ml. three-necked flask equipped with stirrer, thermometer and reflux condenser is charged with 20 ml. water, 16 g. $KMnO_4$ and 3 g. KOH. After solution of $KMnO_4$ and KOH is complete 25 g. of $$(CF_3)_2CFO—CF_2CF_2—CH_2—CH=CH_2$$

the product of Example 5, is rapidly added under vigorous agitation. The agitated mixture is heated to 100° C. and is maintained at that temperature for a period of 5 hours. The mixture is then allowed to cool to room temperature, acidified with 50% aqueous $H_2SO_4$, and is filtered to remove insoluble $MnO_2$. Aqueous and organic phases are separated, the organic layer is taken up with ether, is decolorized with sodium sulfite (to reduce small amounts of permanganate), is dried over anhydrous sodium sulfate, and is filtered. Fractional distillation yields the free acid $(CF_3)_2CFO—CF_2CF_2—COOH$.

EXAMPLE 7

Preparation of $(CF_3)_2CFO—CF_2CF_2—CF_2COF$
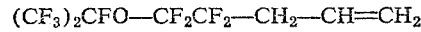

Into a glass lined pressure reaction vessel equipped with a pressure gauge and magnetic stirrer connected to a Dry Ice acetone cooled trap was charged 22 g. (0.043 mol) of $(CF_3)_2CFO—CF_2CF_2—CF_2CF_2I$ and 11 g. (0.14 mol) of liquid sulfur trioxide. The vessel was sealed and vessel and contents were heated to 110° C. for a period of 24 hours, during which period the pressure increaseed to 140 p.s.i.g. Vessel and contents were then cooled to room temperature (about 25° C.), the vessel was vented and the liquid vessel contents were withdrawn. The liquid formed two layers, the upper one of which was decanted, transferred to a distillation apparatus, and subjected to fractional distillation. There was thus recovered a 7 g. fraction (0.018 mol) of $(CF_3)_2CFO—CF_2CF_2—CF_2—COF$, boiling at 77°–79°
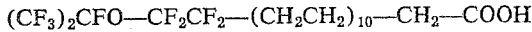
C., and a 6.5 g. residue.

Elemental analysis of that product compared with calculated values for $C_7F_{14}O_2$ as follows:

Calculated (percent): C, 21.99; F, 69.63. Found (percent): C, 21.5; F, 68.7.

The assigned structure was confirmed by infrared analysis which showed the expected carbonyl absorption at 5.31 microns.

EXAMPLE 8

Preparation of $(CF_3)_2CFO—CF_2CF_2—CF_2CF_2—CF_2—COF$ and $(CF_3)_2CFO—CF_2CF_2—CF_2CF_2—CF_2CF_2—OSO_2OSO_2F$ Into a glass lined pressure reaction vessel equipped with a pressure gauge and magnetic stirrer, connected to a Dry Ice acetone cooled trap was charged 72 g. (0.117 mol) of $(CF_3)_2CFO—(CF_2CF_2)_3I$ and 37.4 g. (0.468 mol) of liquid sulfur trioxide. Gas space in the vessel was then flushed with nitrogen, the vessel was sealed, and vessel and contents were heated to 124°–126° C. for a period of 16½ hours. Vessel and contents were then cooled to room temperature, the vessel was vented, and liquid vessel contents were withdrawn. The liquid formed two layers, the upper one of which was decanted and transferred to a distillation apparatus suitable for distillation under reduced pressure. Fractional distillation under reduced pressure yielded 5.4 g. (0.011 mol) of $(CF_3)_2CFO—(CF_2CF_2)_2—CF_2—COF$ boiling at 63° C. at 86 mm. Hg., 47.3 g. (0.0772 mol) of starting material $(CF_3)_2CFO—CF_2CF_2)_3I$ boiling at 99° C. at 90 mm. Hg, and 6.0 g. (0.009 mol) of $(CF_3)_2CFO—(CF_2CF_2)_3OSO_2OSO_2F$ boiling at 103–106° C. at 25 mm. Hg.

Elemental analysis of the acyl fluoride product compared with calculated values for $C_9F_{18}O_2$ as follows:

Calculated (percent): C, 22.41; F, 70.95. Found (percent): C, 23.02; F, 71.54.

Infrared analysis of the acyl fluoride showed the expected carbonyl absorption at 5.35 microns.

Elemental analysis of the pyrosulfuryl fluoride product compared with calculated values for $C_9F_{20}S_2O_7$ as follows:

Calculated (percent): C, 16.27; F, 57.23; S, 9.64. Found (percent): C, 17.02; F, 56.89; S, 9.34.

Infrared analysis of the pyrosulfuryl fluoride product showed the expected $—OSO_2OSO_2F$ absorption of 6.65–6.72 microns.

EXAMPLE 9

Preparation of $(CF_3)_2CFO—CF_2CF_2—CF_2CF_2—CF_2—COF$ and $(CF_3)_2CFO—CF_2CF_2—(CF_2CF_2)_2—OSO_2OSO_2F$ Example 8 was repeated using 50 g. (0.082 mol) of $(CF_3)_2CFO—(CF_2CF_2)_3I$ and 26.2 g. (0.328 mol) of liquid sulfur trioxide. A reaction temperature of 142° C. was maintained for a period of 34½ hours. Reaction pressure was 182 p.s.i.g. Fractional distillation of the reaction product under reduced pressure yielded 8.7 g. (0.018 mol) of $(CF_3)_2CFO—(CF_2CF_2)_2—CF_2—COF$ boiling at 63°–64° C. at 90 mm. Hg, 23 g. (0.038 mol) of unreacted starting material, and 7.5 g. (0.011 mol) of $(CF_3)_2CFO—(CF_2CF_2)_3—OSO_2OSO_2F$, boiling at 105° C. at 25 mm. Hg.

EXAMPLE 10

Preparation of $(CF_3)_2CFO—CF_2CF_2—(CF_2CF_2)_2—CF_2—COF$ and $(CF_3)_2CFO—CF_2CF_2)_3—OSO_2OSO_2F$ Example 8 was repeated using 49 g. (0.068 mol) of $(CH_3)_2CFO—CF_2CF_2—(CF_2CF_2)_3I$ and 23 g. (0.228 mol) of liquid sulfur trioxide. A reaction temperature of 130°–135° C. was maintained for a period of 25 hours. The reaction pressure rose to 170–180 p.s.i.g. Fractional distillation of the reaction product under reduced pressure yielded 7.8 g. (0.013 mol) of $(CF_3)_2CFO—CF_2CF_2—(CF_2CF_2)_2—CF_2—COF$ boiling at 70° C. at 25 mm. Hg, 12 g. (0.17 mol) of unreacted starting material $(CF_3)_2CFO—CF_2CF_2—(CF_2CF_2)_3I$ boiling at 96°–100° C. at 25 mm. Hg and 9.5 g. (0.012 mol) of $(CF_3)_2CFO—CF_2CF_2—(CF_2CF_2)_3—OSO_2—OSO_2F$ boiling at 75°–77° C. at 2 mm. Hg.

Elemental analysis of the acyl fluoride product compared with calculated values for $C_{11}F_{22}O_2$ as follows:

Calculated (percent): C, 22.71; F, 71.80; H, none. Found (percent): C, 22.43; F, 67.14; H, 0.16.

Infrared analysis of the acyl fluoride product showed the expected carbonyl absorption at 5.32 microns.

Elemental analysis of the pyrosulfuryl fluoride product compared with calculated values for $C_{11}F_{24}S_2O_7$ as follows:

Calculated (percent): C, 17.28; F, 59.52; S, 8.39. Found (percent): C, 16.3; F, 57.50; H, 8.01.

Infrared analysis of the pyrosulfuryl fluoride product showed the expected $—OSO_2OSO_2F$ absorption at 6.65–6.72 microns.

EXAMPLE 11

Preparation of $(CF_3)_2CFO—CF_2CF_2—(CH_2CH_2)_8—(CF_2—CFCl)_2—CF_2—COF$ and $(CF_3)_2CFO—CFCF_2)—(CH_2—CH_2)_8—(CFCl—CFCl)_3—OSO_2OSO_2F$ When $(CF_3)_2CFO—CF_2CF_2—(CH_2CH_2)_8—(CF_2—CFCl)_3I$ is reacted with liquid sulfur trioxide following the procedure set forth in Example 20, there is obtained as product a mixture of unreacted starting material, $(CF_3)_2CFO—CF_2CF_2—(CH_2CH_2)_8—(CF_2—CFCl)_2—CF_2—COF$ and $(CF_3)_2CFO—CF_2CF_2—(CH_2CH_2)_8—(CF_2—CFCl)_3—OSO_2OSO_2F$ from which product mixture the acyl fluoride product and the pyrosulfuryl fluoride product can be separated by fractional crystallization from methylene chloride.

EXAMPLE 12

Preparation of $(CF_3)_2CFO—CF_2CF_2—CF_2CF_2—CF_2—COOH$

A 50 ml. flask was charged with 10 g. (0.015 ml) of $(CF_3)_2CFO—CF_2CF_2—(CF_2CF_2)_2—OSO_2OSO_2F$, and about 25 ml. of 25 percent aqueous NaOH was slowly added thereto. The temperature of the contents of the flask rose to 45°–50° C. After standing for one hour the mixture was acidified with conc. sulfuric acid. Aqueous and organic layers were separated, the aqueous layer was extracted with ether, organic layer and ethereal extracts were combined, dried over sodium sulfate, and distilled under reduced pressure. After the more volatile ether was distilled over there was recovered as distillate a main fraction of 5 g. (0.01 mol) of $(CF_3)_2CFO—CF_2CF_2—CF_2CF_2—CF_2—COOH$ boiling at 103°–108° C. at 22 mm. Hg.

Infrared analysis of the product showed the expected carboxyl absorption at 3.2 microns and the expected carbonyl absorption at 5.69 microns, confirming assigned structure.

EXAMPLE 13

Preparation of $(CF_3)_2CFO—CF_2CF_2—(CF_2CF_2)_2—CF_2—COOH$

When a mixture of $(CF_3)_2CFO—CF_2CF_2—(CF_2CF_2)_2—CF_2—COF$ and $(CF_3)_2CFO—CF_2CF_2—(CF_2CF_2)_3—OSO_2OSO_2F$ is hydrolyzed following the procedure set forth in Example 12, there is obtained as product the acid $(CF_3)_2CFO—CF_2CF_2—(CF_2CF_2)_2—CF_2—COOH$.

EXAMPLE 14

Preparation of $(CF_3)_2CFO\text{—}CF_2CF_2\text{—}CF_2\text{—}COOH$

A 200 ml. beaker is charged with 100 ml. of ice water and 15 g. of $(CF_3)_2CFO\text{—}CF_2CF_2\text{—}CF_2CF_2\text{—}COF$. To this mixture are added a few drops of phenolphthalein indicator and the mixture is titrated to the phenolphthalein endpoint with 10 percent aqueous KOH, to form the potassium salt $(CF_3)_2CFO\text{—}CF_2CF_2\text{—}CF_2\text{—}COOK$. The mixture so neutralized is then acidified with dilute aqueous sulfuric acid, aqueous and organic layers are separated, the aqueous layer is twice extracted with ether, organic layer and ethereal extracts are combined, dried over anhydrous sodium sulfate, and are fractionally distilled under reduced pressure. After removal of the more volatile ether there is obtained as distillate the acid $(CF_3)_2CFO\text{—}CF_2CF_2\text{—}CF_2\text{—}COOH$.

EXAMPLE 15

Preparation of
$(CF_3)_2CFO\text{—}CF_2CF_2\text{—}CH_2CH_2\text{—}CH_2\text{—}COOH$ A suspension of 119 g. (0.30 mol) of $(CF_3)_2CFO\text{—}CF_2CF_2\text{—}CH_2CH_2\text{—}CH_2\text{—}COOC_2H_5$ in 150 ml. of aqueous potassium hydroxide (30 g., 0.54 mol) was placed in a one-liter flask and heated slowly to 95° C. After 15–20 minutes at this temperature a clear solution was formed and foaming occurred. The solution was then allowed to cool to room temperature, was then cooled in an ice bath, and was acidified to a pH of 2 by addition of concentrated hydrochloric acid. Aqueous and organic layers were separated, the aqueous layer was twice extracted with methylene chloride, the organic layer and methylene chloride extracts were combined and refluxed with a Dean-Stark trap to remove water (about 5 ml.). Removal of the methylene chloride by distillation left a pale yellow oil, which was then distilled at reduced pressure. The sought-for product $(CF_3)_2CFO\text{—}CF_2CF_2\text{—}CH_2CH_2\text{—}COOH$ was collected as the fraction distilling at 78°–81° C. at 0.1 mm. Hg $n_D^{23}=1.3285$. Yield 82 g. (90% of theory).

Elemental analysis of the product compared with calculated values for $C_9H_7F_{11}O_3$ as follows:

Calculated (percent): C, 29.1; H, 1.9. Found (percent): C, 29.4; H, 1.1.

EXAMPLE 16

Preparation of $(CF_3)_2CFO\text{—}CF_2CF_2\text{—}CF_2\text{—}COONa$

A 10 g. portion of $(CF_3)_2CFO\text{—}CF_2CF_2\text{—}CF_2\text{—}COOH$ dispersed in 20 ml. of ice water containing a small amount endpoint by dropwise addition of a 20 percent aqueous solution of NaOH. The mixture is then dried under vacuum at 80°–90° C. to obtain as residue about 10 g. of the salt $(CF_3)_2CFO\text{—}CF_2CF_2\text{—}CF_2\text{—}COONa$

EXAMPLE 17

Preparation of $(CF_3)_2CFO\text{—}CF_2CF_2\text{—}(CF_2CF_2)_2\text{—}CF_2\text{—}COOCH_3$ A 100 ml. flask equipped with reflux condenser and dropping funnel was charged with 13.8 g. (0.0237 mol) of $(CF_3)_2CFO\text{—}CF_2CF_2\text{—}(CF_2CF_2)_2\text{—}CF_2\text{—}COF$ and 11.0 g. (0.0145 mol) of $(CF_3)_2CFO\text{—}CF_2CF_2\text{—}(CF_2CF_2)_3\text{—}OSO_2OSO_2F$ The mixture in the flask was cooled to 0° C. and 28 g. (0.88 mol) of $CH_3OH$ was slowly added over a period of 20 minutes. The mixture was then heated and maintained under reflux for a period of 19 hours. The mixture was then cooled to room temperature (about 25° C.), washed with ice water, organic and aqueous layers were separated, the organic layer was dried over anhydrous sodium sulfate, filtered and distilled under reduced pressure. There was thus recovered as distillate 17 g. (0.029 mol) of the product $(CF_3)_2CFO\text{—}CF_2CF_2\text{—}(CF_2CF_2)_2\text{—}CF_2\text{—}COOCH_3$ boiling at 51° C. at 2 mm. Hg.

Elemental analysis of the product thus obtained compared with calculated values for $C_{12}F_{21}H_3O_3$ as follows:

Calculated (percent): C, 24.27; F, 67.15; H, 0.51. Found (percent): C, 22.85; F, 65.18; H, 0.63.

Infrared analysis of the product showed the expected carbonyl absorption at 5.6 microns.

EXAMPLE 18

Preparation of $(CF_3)_2CFO\text{—}CF_2CF_2\text{—}CF_2CF_2\text{—}CF_2\text{—}COOCH_3$ Following the procedure set forth in Example 16 there were reacted 12.2 g. (0.025 mol) of $(CF_3)CFO\text{—}CF_2CF_2\text{—}CF_2CF_2\text{—}CF_2\text{—}COF$ and 10.8 g. (0.016 mol) of $(CF_3)_2CFO\text{—}CF_2CF_2\text{—}(CF_2CF_2)_2OSO_2OSO_2F$ with 26 g. (0.81 mol) of $CH_3OH$ to obtain 16 g. (0.031 mol) of $(CF_3)_2CFO\text{—}CF_2CF_2\text{—}CF_2CF_2\text{—}CF_2\text{—}COOCH_3$ Infrared analysis of that product showed the expected carbonyl absorption at 5.6 microns, confirming assigned structure.

EXAMPLE 19

Preparation of $(CF_3)_2CFO\text{—}CF_2CF_2\text{—}(CH_2CH_2)_5\text{—}(CHF\text{—}CFCl)_5\text{—}CHF\text{—}COOC_6H_{13}$ When a mixture of $(CF_3)_2CFO\text{—}CF_2CF_2\text{—}(CH_2CH_2)_5\text{—}(CHF\text{—}CFCl)_5CHF\text{—}COF$ and $(CF_3)_2CFO\text{—}CF_2CF_2\text{—}(CH_2CH_2)_5)\text{—}(CHF\text{—}CFCl)_6\text{—}OSO_2OSO_2F$ is reacted with hexyl alcohol $(C_6H_{13}OH)$ using excess alcohol as reaction medium, there is obtained as product the ester $(CF_3)_2CFO\text{—}CF_2CF_2\text{—}(CH_2CH_2)_5\text{—}(CHF\text{—}CFCl)_5\text{—}CHF\text{—}COOC_6H_{13}$

EXAMPLE 20

Preparation of $(CF_3)_2CFO\text{—}CF_2CF_2\text{—}CF_2CF_2\text{—}CF_2\text{—}CONH_2$ A 18.5 g. (0.038 mol) portion of $(CF_3)_2CFO\text{—}CF_2CF_2\text{—}CF_2CF_2\text{—}CF_2\text{—}COOCH_3$ was dissolved in 50 ml. of ethyl ether. Under constant stirring this solution was cooled to 0° C. and a stream of gaseous ammonia was slowly bubbled into the stirred solution until no more ammonia was taken up by the solution. The solution was allowed to warm to room temperature, was transferred to a distillation apparatus suitable for distillation under reduced pressure, and volatiles were distilled off under atmospheric pressure until the pot reached a temperature of 69° C. The pot residue was then allowed to cool to room temperature (about 25° C.) and the still was evacuated to 20 mm. Hg. to remove remaining volatiles. There was thus obtained as residue 18 g. of the sought-for product, $(CF_3)_2CFO\text{—}CF_2CF_2\text{—}CF_2CF_2\text{—}CF_2\text{—}CONH_2$ a slightly waxy, white solid, soluble in benzene and petroleum ether. The product, upon recrystallization from petroleum ether, melted at 65°–67° C.

Elemental analysis of the recrystallized product compared with calculated values for $C_9H_2NOF_{17}$ as follows:

Calculated (percent): C, 22.6; H, 0.42; N, 2.93; F, 67.5.
Found (percent): C, 21.75; H, 1.56; N, 3.22; F, 65.8.

The assigned structure was confirmed by infrared analysis showing the expected absorption bands at 2.95, 3.1, 5.9 and 6.2 microns corresponding to the amide fraction, and a band at 10.1 microns characteristic of the ether linkage in this type of compound.

EXAMPLE 21

Preparation of $(CF_3)_2CFO$—
$CF_2CF_2$—$(CF_2CF_2)_4$—$CF_2$—$CONH_2$ 20 g. (0.025 mol) of $(CF_3)_2CFO$—$CF_2CF_2$—$(CF_2CF_2)_4$—$CF_2$—$COOCH_3$ were reacted with gaseous ammonia following the procedure set forth in Example 17. There was obtained 26 g. of crude product $(CF_3)_2CFO$—$CF_2CF_2$—$(CF_2CF_2)_4$—$CF_2$—$CONH_2$ which was soluble in acetonitrile, but not very soluble in benzene, carbon tetrachloride or petroleum ether. Recrystallization of the crude product from acetonitrile yielded 15 g. of purified product, M.P. 114°–115° C. A sample for analysis, M.P. 120°–121° C. was obtained by further recrystallization from acetonitrile. Elemental analysis of the material melting at 120°–121° C. compared with calculated values for $(CF_3)_2CFO$—$CF_2CF_2$—$(CF_2CF_2)_4$—$CF_2$—$CONH_2$ as follows:

Calculated (percent): C, 23.2; H, 0.26; N, 1.8; F, 70.7.
Found (percent): C, 23.54; H, 0.48; N, 2.40; F, 68.28.

The assigned structure was confirmed by infrared analysis showing the expected absorption bands at 2.85, 3.03, 5.83 and 6.15 microns corresponding to the amide function, and a band at 10.15 microns characteristic of the ether linkage in this type of compound.

EXAMPLE 22

Preparation of $(CF_3)_2CFO$—$CF_2CF_2$—$(CF_2CF_2)_4$—$CF_2$—$CONH$—$CH_2CH_2OH$ A 5 g. (0.0063 mol) portion of $(CF_3)_2CFO$—$CF_2CF_2$—$(CF_2CF_2)_4$—$CF_2$—$COOCH_3$ was dissolved in 25 ml. of ether, the solution thus obtained was cooled to 5°–10° C., and a total of 0.82 g. (0.013 mol) of 2-amino ethanol in a total of 40 ml. of ether was added dropwise. The solution was stirred at 5°–10° C. for a period of 24 hours. A small amount of precipitate formed was removed by filtration, and the filtrate was evaporated to dryness. The residue was triturated with petroleum ether and dried in vacuo to yield 3.7 g. of crude product, M.P. 70°–72° C. A portion of the crude product was purified by recrystallization from petroleum ether. The purified product, $(CF_3)_2CFO$—$CF_2CF_2$—$(CF_2CF_2)_4$—$CF_2$—$CONH$—$CH_2CH_2OH$ had a melting point of 78°–79° C.

Elemental analysis of the purified product compared with calculated values for $C_{17}H_6NO_3F_{29}$ as follows:

Calculated (percent): C, 24.8; H, 0.73; N, 1.7; F, 66.9.
Found (percent): C, 25.19; H, 0.68; N, 2.01; F, 62.99.

Infrared analysis of the purified product showed the expected O—H and N—H band at 2.99 microns, amide bands at 5.88 and 6.45 microns, and a band at 10.09 microns corresponding to the ether linkage.

EXAMPLE 23

Preparation of $(CF_3)_2CFO$—$CF_2CF_2$—
$(CF_2CF_2)_8$—$(CH_2CH_2)_2$—$CH_2$—$CONH$—$C_6H_{13}$ To a solution of 30 g. of $(CF_3)_2CFO$—$CF_2CF_2$—$(CF_2CF_2)_8$—
$(CH_2CH_2)_2$—$CH_2COCl$ in 75 ml. of ether is added a solution of 10 g. hexylamine in 20 ml. ether over a period of 1 hour with constant stirring of the reaction mixture. A white precipitate of hexylamine-hydrogen chloride is immediately formed. Stirring is continued at reflux for 1 hour, after which time the product mixture is filtered and distilled to recover the amide $(CF_3)_2(CFO$—$CF_2CF_2$—$(CF_2CF_2)_8$—
$(CH_2CH_2)_2$—$CH_2CONHC_6H_{13}$

EXAMPLE 24

Preparation of $(CF_3)_2CFO$—$CF_2CF_2$—
$(CF_2CF_2)_4$—$CF_2CONHCH_2CH_2Cl$

Two grams of (0.0024 mol) of $(CF_3)_2CFO$—$CF_2CF_2$—$(CF_2CF_2)_4$—
$CF_2$—$CONHCH_2CH_2OH$ and 0.48 g. (0.004 mol) of thionyl chloride were mixed together, the mixture was heated to a temperature of 85°–95° C., and was maintained at that temperature for a period of 45 minutes. The mixture was then allowed to cool to room temperature (about 25° C.), was triturated with cold water, and the residue was dried at 55° C. in vacuo to yield 1.7 g. of crude $(CF_3)_2CFO$—$CF_2CF_2$—$(CF_2CF_2)_4$—
$CF_2$—$CONH$—$CH_2CH_2Cl$ product, M.P. 87°–89° C. A portion of the crude product was twice recrystallized from acetonitrile. The product so purified had a M.P. 87°–88° C.

Elemental analysis of the purified product compared with calculated values for $C_{17}H_5NO_2ClF_{29}$ as follows:

Calculated (percent): C, 24.3; H, 0.6; N, 1.66; Cl, 4.21; F, 65.4. Found (percent): C, 24.93; H, 0.73; N, 2.00; Cl, 4.31; F, 60.89.

Infrared analysis of the purified product showed the expected bands at about 2.93, 5.87 and 6.4 microns corresponding to the amide function.

EXAMPLE 25

Preparation of $(CF_3)_2CFO$—$CF_2CF_2$—
$CH_2CH_2$—$CH_2$—$COCl$

A 250 ml. three-necked flask fitted with reflux condenser, thermometer, dropping funnel and magnetic stirrer was charged with 50 g. (0.4 mol) of thionyl chloride. The thionyl chloride was stirred and heated to reflux, and 80 g. (0.216 mol) of 5,5,6,6-tetrafluoro-6-perfluoroisopropoxy hexanoic acid was added from the dropping funnel over a ½ hour period. The clear solution was stirred and refluxed an additional hour, after which time the excess thionyl chloride was removed by distillation at atmospheric pressure. The residual oil was distilled at reduced pressure to yield 81 g. of the product $(CF_3)_2CFO$—$CF_2CF_2$—$CH_2CH_2$—$CH_2$—$COCl$ as a colorless liquid, B.P. 63°–65° C. at 5 mm. Hg, $n_D^{23}=1.3356$.

Elemental analysis of the product compared with calculated values for $C_9H_6ClF_{11}O_2$ as follows:

Calculated (percent): C, 27.6; H, 1.5. Found (percent): C, 27.5; H, 1.4.

EXAMPLE 26

Preparation of $(CF_3)_2CFO$—$CF_2CF_2$—
$(CF_2CF_2)_5$—$(CH_2CH_2)_5$—$CH_2$—$CN$ A 250 ml. flask is charged with 40 g. of the amide $(CF_3)_2CFO$—$CF_2CF_2$—$(CF_2CF_2)_5$—
$(CH_2CH_2)_5$—$CH_2CONH_2$ and 15 g. of phosphorous pentoxide, and the reactants are mixed well. This mixture is then heated to between 150°–200° C. for a period of 2 hours. The mixture is then allowed to cool to room temperature, and the cooled mixture is extracted with ether. The ethereal extract is evaporated to dryness to yield the crude product $(CF_3)_2CFO—CF_2CF_2—(CF_2CF_2)_5—(CH_2CH_2)_5CH_2CN$

EXAMPLE 27

Oil repellency tests of illustrative amides

Illustrative amides of the present invention were evaluated as textile treating agents for use in imparting oil repellency to the treated textile.

The procedure employed in determining the oil repellency ratings is described, for example, on pages 323–4 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute period the wetting and penetration of the fabric is visually observed. The number corresponding to the mixture containing the highest percentage of heptane which does not penetrate or wet the fabric is considered to be the oil repellency rating of the treated fabric.

The tests were conducted on one inch square pieces of 80″ x 80″ cotton print cloth. In preparing the samples for test the 80″ x 80″ samples of cotton print cloth were saturated in the test solutions containing 0.2 g. of the amide per 3 ml. of acetone following which the samples were dried at 110° C. for 5 minutes, cured at 160° C. for 3 minutes and then pressed and allowed to stand for 3 minutes before testing.

Test results are shown in the table below.

TABLE

| Amide: | Oil repellency rating |
|---|---|
| $(CF_3)_2CFO—CF_2CF_2—CF_2CF_2—CF_2—CONH_2$ | 100 |
| $(CF_3)_2CFO—CF_2CF_2—(CF_2CF_2)_4—CF_2—CONH_2$ | 120 |
| $(CF_3)_2CFO—CF_2CF_2—(CF_2CF_2)_4—CF_2—CONH—CH_2CH_2Cl$ | 110 |

Preparative methods other than those herein described may be employed to make the novel compounds of this invention. Preparation of the acids, esters, nitriles and amides of this invention from telogen starting materials having the formula

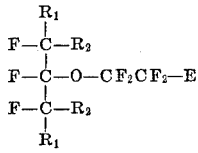

wherein $R_1$, $R_2$ and E have the aforestated meanings by telomerization reaction with appropriate telomerizable terminally ethylenically unsaturated compounds having a nitrile, carboxyl, amide or ester group in terminal position to form a corresponding iodine- or bromine-containing nitrile, acid, amide or ester, followed by replacement of the bromine or iodine with chlorine, fluorine or hydrogen to obtain the compounds claimed herein is described in our copending application Ser. No. 633,359, filed Apr. 25, 1967 of which this application is a continuation-in-part. Example 28 below illustrates preparation of the ester $(CF_3)_2CFO—CF_2CF_2—CH_2CH_2—CH_2—COOC_2H_5$ by that procedure.

EXAMPLE 28

Preparation of $(CF_3)_2CFO—CF_2CF_2—CH_2CH_2—CH_2—COOC_2H_5$

A mixture of 35 g. of $CH_2=CHCH_2COOC_2H_5$ and 9.3 g. of $(CF_3)_2CFO—CF_2CF_2I$ (both freshly distilled) was heated at 90° C. for three hours in the presence of 0.82 g. of benzoyl peroxide as catalyst. The mixture was then subjected to fractional distillation under reduced pressure, yielding $(CF_3)_2CFO—CF_2CF_2—CH_2CHI—CH_2—COOC_2H_{13}$ B.P. 67° C. at 0.2 mm. Hg in 62% yield.

A 173 g. portion of $(CF_3)_2CFO—CF_2CF_2—CH_2CHI—CH_2—COOC_2H_5$ prepared as described above, was refluxed for a period of 3 hours with 1200 ml. glacial acetic acid containing 60 g. of zinc dust. The solution was then allowed to cool overnight, was drowned in water, aqueous and organic layers were separated, the organic layer was washed twice with water, the aqueous layer was twice extracted with 100 ml. portions of methylene chloride, the organic layer and the methylene chloride extracts were combined, dried over anhydrous magnesium sulfate, filtered, and subjected to fractional distillation under reduced pressure. There was thus obtained the product $(CF_3)_2CFO—CF_2CF_2—CH_2CH_2—CH_2—COOC_2H_5$ B.P. 71° C. at 6 mm. Hg, $n_D^{23}=1.3308$ in 78% yield.

Hydrolysis of this ester with potassium hydroxide in aqueous alcohol, at 95° C., followed by acidification with hydrochloric acid gave the acid $(CF_3)_2CFO—CF_2CF_2—CH_2CH_2—CH_2—COOH$ B.P. 73°–74° C. at 0.1 mm. Hg, $n_D^{23}=1.3282$ in 90 percent yield.

While fluorinated telomers useful as starting material for the preparation of the fluorinated compounds of the present invention may be prepared as discrete compounds, they are generally obtained as mixtures of compounds of varying chain length and corresponding varying molecular weights. It is to be understood that both, the individual discrete fluorinated telomers, as well as their mixtures of compounds of varying chain length are suitable for the preparation of the novel compounds of this invention. When employing as starting material mixtures of fluorinated telomers of varying chain length, the compounds of the present invention will, of course, be obtained as mixtures of compounds of varying chain length. If desired, individual products can be separated from such product mixtures by conventional separation techniques as for example by fractional distillation, or by fractional crystallization using suitable inert solvents such as methylene chloride, ether, acetonitrile, carbon tetrachloride, and the like, or the product mixture may be separated into fractions of narrow ranges of molecular weights having desired properties. It is intended that the appended claims cover the individual compounds as well as mixtures thereof having varying chain length.

Further, when the telomerizable ethylenically unsaturated compounds $CZ_1Z_2=CZ_3Z_4$ and $CX_1X_2=CX_3X_4$ employed in the telomerization reaction respectively include $Z_1$–$Z_4$ and/or $X_1$–$X_4$ substituents of differing atomic weights, and these telomerizable ethylenically unsaturated compounds are asymmetric, then, with reference to Formula II above, the telomer product will predominantly consist of telomers wherein the bifunctional groups —$(CZ_1Z_2—CZ_3Z_4)$— and/or —$(CX_1X_2—CX_3X_4)$— are arranged in the molecule so that the sums of the atomic weights of $Z_3$ and $Z_4$, and of $X_3$ and $X_4$, are greater than the sums of the atomic weights of $Z_1$ and $Z_2$, and of $X_1$ and $X_2$, respectively. In correspondingly smaller portions of the telomer product the $Z_1$–$Z_4$ and $X_1$–$X_4$ substituents will be arranged in order reverse to that described above or will be arranged in randomly alternating order. It is intended that the appended claims cover compounds wherein in bifunctional groups —$(CZ_1Z_2—CZ_3Z_4)$— and —$(CX_1X_2—CX_3X_4)$— the $Z_1$–$Z_4$ and $X_1$–$X_4$ substituents are arranged in any of the above-described orders, as well as mixtures of these compounds.

Since various changes and modifications may be made in the invention without departing from the spirit and

We claim:
1. Compounds having the general formula

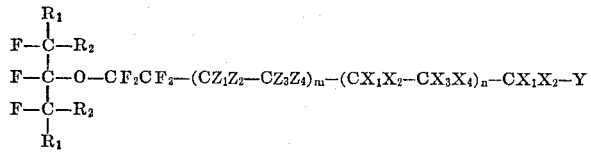

wherein (a) $R_1$ and $R_2$ are F or fluoroalkyl groups having from 1 to 2 carbon atoms, structure, which $R_1$ and $R_2$ groups may each having provided that not more than three of the $R_1$ and $R_2$ groups may be fluoroalkyl groups,
(b) $-(CZ_1Z_2-CZ_3Z_4)-$ is a bifunctional group wherein $Z_1$, $Z_2$, $Z_3$ and $Z_4$ are independently selected from the group consisting of H, F and Cl, provided $Z_1-Z_4$ do not include more than two chlorine atoms,
(c) $-(CX_1X_2-CX_3X_4)-$ is a bifunctional group wherein $X_1$, $X_2$, $X_3$ and $X_4$ are independently selected from the group consisting of H, F and Cl, provided $X_1-X_4$ do not include more than one chlorine atom, and provided further that $X_3$ and $X_4$ do not include, in combination, H and one halogen atom,
(d) $m$ and $n$ are each integers of from 0 to about 20, with the proviso that the sum of $m$ and $n$ is from 1 to about 20,
(e) $-CX_1X_2-$ is a bifunctional group wherein $X_1$ and $X_2$ are independently selected from the group consisting of H, F and Cl, except that $X_1$ and $X_2$ may not both be Cl, and provided that when $n$ is greater than 0, $X_1$ and $X_2$ are the same as $X_1$ and $X_2$ in bifunctional group $(CX_1X_2-CX_3X_4)-$,
(f) Y is a radical of the formula

wherein Q is a substituent selected from the group consisting of
(i) —OA, wherein A is selected from the group consisting of hydrogen and the alkali metals, and
(ii) hal, wherein hal is a halogen selected from the group consisting of F and Cl.
2. Compounds according to claim 1 wherein Y is

wherein A is selected from the group consisting of H and the alkali metals.
3. Compounds according to claim 2 wherein A is H.
4. Compounds according to claim 2 wherein A is an alkali metal.
5. Compounds according to claim 1 wherein Y is

wherein hal is a halogen selected from the group consisting of F and Cl.
6. Compounds according to claim 5 wherein hal is F.
7. Compounds according to claim 5 wherein hal is Cl.
8. Compounds according to claim 1 wherein from 1 to 3 of the $R_1$ and $R_2$ groups are perfluoroalkyl groups.
9. Compounds according to claim 1 wherein the $R_1$ and $R_2$ groups are F.
10. Compounds according to claim 9 wherein Y is

wherein A is selected from the group consisting of H and the alkali metals.
11. Compounds according to claim 10 wherein A is H.
12. Compounds according to claim 10 wherein A is an alkali metal.
13. Compounds according to claim 9 wherein Y is

wherein hal is a halogen selected from the group consisting of F and Cl.
14. Compounds according to claim 13 wherein hal is F.
15. Compounds according to claim 13 wherein hal is Cl.
16. Compounds according to claim 9 wherein the bifunctional group $-(CZ_1Z_2-CZ_3Z_4)-$ is selected from the group consisting of $-CF_2-CF_2-$, $-CH_2-CF_2-$, $-CF_2-CFCl-$ and $-CH_2-CH_2-$.
17. Compounds according to claim 9 wherein the bifunctional group $-(CX_1X_2-CX_3X_4)-$ is selected from the group consisting of $-CF_2-CF_2-$, $-CH_2-CF_2-$, and $-CH_2-CH_2-$ and wherein the bifunctional group $-CX_1X_2-$ is selected from the group consisting of $-CF_2-$ and $-CH_2-$.
18. Compounds according to claim 17 wherein the bifunctional group $-(CZ_1Z_2-CZ_3Z_4)-$ is selected from the group consisting of $-CF_2-CF_2-$, $-CH_2-CF_2-$, $-CF_2-CFCl-$ and $-CH_2-CH_2-$.
19. Compounds according to claim 18 wherein Y is

wherein A is selected from the group consisting of H and the alkali metals.
20. Compounds according to claim 19 wherein A is H.
21. Compounds according to claim 19 wherein A is an alkali metal.
22. Compounds according to claim 18 wherein Y is

wherein hal is a halogen selected from the group consisting of F and Cl.
23. Compounds according to claim 22 wherein hal is F.
24. Compounds according to claim 22 wherein hal is Cl.
25. Compounds according to claim 18 wherein the sum $m$ and $n$ is from 1 to about 10.
26. Compounds according to claim 25 wherein Y is

wherein A is selected from the group consisting of H and the alkali metals.
27. Compounds according to claim 26 wherein A is H.
28. Compounds according to claim 26 wherein A is an alkali metal.
29. Compounds according to claim 25 wherein Y is

wherein hal is a halogen selected from the group consisting of F and Cl.

30. Compounds according to claim 29 wherein hal is F.
31. Compounds according to claim 29 wherein hal is Cl.
32. Compounds according to claim 1 wherein the $R_1$ groups are both F and where in the bifunctional group $-(CZ_1Z_2-CZ_3Z_4)-$ is $-CF_2-CF_2-$.
33. Compounds according to claim 32 wherein the bifunctional group $-(CX_1X_2-CX_3X_4)-$ is selected from the group consisting of $-CF_2CF_2-$ and $-CH_2-CH_2-$ and wherein the bifunctional group $-CX_1X_2$ is selected from the group consisting of $-CH_2-$ and $-CF_2-$.
34. Compounds according to claim 33 wherein Y is $$-\underset{OA}{\overset{O}{\underset{\|}{C}}}-$$

wherein A is selected from the group consisting of H and the alkali metals.
35. Compounds according to claim 34 wherein A is H.
36. Compounds according to claim 34 wherein A is an alkali metal.
37. Compounds according to claim 33 wherein Y is $$-\underset{hal}{\overset{O}{\underset{\|}{C}}}-$$

wherein hal is a halogen selected from the group consisting of F and Cl.
38. Compounds according to claim 37 wherein A is F.
39. Compounds according to claim 37 wherein A is Cl.
40. Compounds according to claim 1 wherein the $R_1$ and $R_2$ groups are both F, wherein the bifunctional group $$-(CZ_1Z_2-CZ_3Z_4)-$$

is $-CF_2-CF_2-$, wherein the bifunctional group $$-(CX_1X_2-CX_3X_4)-$$

is selected from the group consisting of $-CF_2-CF_2-$ and $-CH_2-CH_2-$, wherein the bifunctional group $-CX_1X_2-$ is selected from the group consisting of $-CF_2-$, and $-CH_2-$, and wherein the sum of $m$ and $n$ is from 1 to about 10.
41. Compounds according to claim 40 wherein Y is $$-\underset{OA}{\overset{O}{\underset{\|}{C}}}-$$

wherein A is selected from the group consisting of H and the alkali metals.
42. Compounds according to claim 41 wherein A is H.

43. Compounds according to claim 41. wherein A is an alkali metal.
44. A compound according to claim 41 which is $(CF_3)_2CFO-CF_2CF_2-CF_2CF_2-CF_2-COOH$.
45. A compound according to claim 41 which is $(CF_3)_2CFO-CF_2CF_2-CH_2CH_2-CH_2-COOH$.
46. A compound according to claim 41 which is $(CF_3)_2CFO-CF_2CF_2-(CF_2CF_2)_2-CF_2-COOH$.
47. Compounds according to claim 1 wherein the $R_1$ and $R_2$ groups are both F, wherein the bifunctional group $-(CZ_1Z_2-CZ_3Z_4)-$ is $-CF_2-CF_2-$, wherein the bifunctional group $-(CX_1X_2-CX_3X_4)-$ is selected from the group consisting of $-CF_2-CF_2-$ and $$-CH_2-CH_2-$$

wherein the bifunctional group $-CX_1X_2-$ is selected from the group consisting of $-CF_2-$ and $-CH_2-$, wherein the sum of $m$ and $n$ is from 1 to about 10, and wherein Y is $$-\underset{hal}{\overset{O}{\underset{\|}{C}}}-$$

wherein hal is a halogen selected from the group consisting of F and Cl.
48. Compounds according to claim 47 wherein hal is F.
49. Compounds according to claim 47 wherein hal is Cl.
50. A compound according to claim 47 which is $(CF_3)_2CFO-CF_2CF_2-CF_2CF_2-CF_2-COF$.
51. A compound according to claim 47 which is $(CF_3)_2CFO-CF_2CF_2-(CF_2CF_2)_2-CF_2-COF$.
52. A compound according to claim 47 which is $(CF_3)_2CFO-CF_2CF_2-CH_2CH_2-CH_2-COCl$.

References Cited
UNITED STATES PATENTS 3,453,333  7/1969  Litt et al. _____ 260—614
2,713,593  7/1955  Brice _____ 260—535

LORRAINE A. WEINBERGER, Primary Examiner

E. J. SKELLY, Assistant Examiner

U.S. Cl. X.R.

117—139.5 CQ; 252—54.6, 351; 260—404, 405.5, 464, 465.6, 457, 458, 468 R, 484 R, 514 R, 531 R, 535 H, 543 R, 544 F, 544 L, 544 Y, 545 R, 557 R, 561 HL, 611 R, 616 F

UNITED STATES PATENT OFFICE
CERTIFICATE OF CORRECTION

PATENT NO. : 3,706,773

DATED : December 19, 1972

INVENTOR(S) : LOUIS GENE ANELLO, RICHARD FRANCIS SWEENEY and MORTON HERBERT LITT It is certified that error appears in the above-identified patent and that said Letters Patent are hereby corrected as shown below:

Col. 1, line 30 - "Z-Z4" should read -- $Z_1 - Z_4$ --;

Col. 1, line 55 - Delete "(I)";

Col. 2, line 55 - Insert "(I)";

Col. 3, lines 50-51 - Delete "U.S. Patents 3,453,333 and 3,470,256 repectively" and insert therefor -- U.S. Patent 3,514,387 --;

Col. 4, line 65 - "at" should read -- as --;

Col. 5, line 20 (2nd. formula) - "$\begin{array}{c} R_2 \\ | \\ F-C-R_2 \end{array}$"  should read -- $\begin{array}{c} R_1 \\ | \\ F-C-R_2 \end{array}$ --;

Col. 7, 1st. formula - "$\begin{array}{c} O \\ \| \\ -C \\ \| \\ Cl \end{array}$"  should read  -- $\begin{array}{c} O \\ \| \\ -C \\ | \\ Cl \end{array}$ --;

Col. 9, line 6 - "$[(CF_3)_2CFOCF_2CF_2CH_2CH_2OSO_2]_2$" should read -- $[(CF_3)_2CFOCF_2CF_2CH_2CH_2OSO_2]_2O$ --;

UNITED STATES PATENT OFFICE
CERTIFICATE OF CORRECTION

PATENT NO. : 3,706,773
DATED : December 19, 1972
INVENTOR(S) : LOUIS GENE ANELLO, RICHARD FRANCIS SWEENEY and MORTON HERBERT LITT It is certified that error appears in the above-identified patent and that said Letters Patent are hereby corrected as shown below:

Col. 9, line 31 - that part which reads "-$CH_2CH_2$" should read -- $CH_2CH_2I$ --;

Col. 9, line 66 - that part of the formula which reads "$CH_2CH_2$-COOH" should read -- $CH_2CH_2$-$CH_2$-COOH --;

Col. 10, line 7 - that part which reads "$CH_2CH_2CH_2$-COOH" should read -- $CH_2CH_2$-$CH_2$-COOH --;

Col. 10, line 11 - that part which reads "$CH_2CH=CH_2$" should read -- $CH_2$-$CH=CH_2$ --;

Col. 10, line 56 - that part which reads "$CF_2CF_2$-COOH" should read -- $CF_2CF_2$-$CH_2$-COOH --;

Col. 10, line 59 - that part which reads "$CF_2COF$" should read -- $CF_2$-COF --;

Col. 10, line 67 - "increaseed" should read -- increased --;

Col. 11, line 30 - "$(CF_3)_2CFO-CF_2CF_2)_3I$" should read -- $(CF_3)_2CFO-(CF_2CF_2)_3I$ --;

UNITED STATES PATENT OFFICE
CERTIFICATE OF CORRECTION

PATENT NO. : 3,706,773
DATED : December 19, 1972
INVENTOR(S) : LOUIS GENE ANELLO, RICHARD FRANCIS SWEENEY and MORTON HERBERT LITT It is certified that error appears in the above-identified patent and that said Letters Patent are hereby corrected as shown below:

Col. 11, line 67 (Example 10) - that part which reads "$-CF_2CF_2)_3-$" should read -- $-CF_2CF_2-(CF_2CF_2)_3-$ --;

Col. 12, line 18 - "H, 8.01" should read -- S, 8.01 --;

Col. 12, line 26 - that part which reads "$CFCF_2)-$" should read -- $CFCF_2-$ --;

Col. 12, line 47 - "(0.015 ml)" should read -- (0.015 mol) --;

Col. 13, line 38 - that part which reads "$CH_2CH_2-COOH$" should read -- $CH_2CH_2-CH_2-COOH$ --;

Col. 13, line 52 - after "amount" insert -- of phenolphtalein is neutralized to the phenolphtalein --;

Col. 13, line 72 - after "heated" insert -- to --;

Col. 14, line 41 - that part which reads - "$-(CH_2CH_2)_5)-$" should read -- $-(CH_2CH_2)_5-$ --;

Col. 17, line 17 - after "minute" insert -- time --;

Col. 19, lines 16-17 - after "atoms," delete -- structure, which $R_1$ and $R_2$ groups may each having --;

UNITED STATES PATENT OFFICE
CERTIFICATE OF CORRECTION

PATENT NO. : 3,706,773
DATED : December 19, 1972
INVENTOR(S) : LOUIS GENE ANELLO, RICHARD FRANCIS SWEENEY and MORTON HERBERT LITT It is certified that error appears in the above-identified patent and that said Letters Patent are hereby corrected as shown below:

Col. 19, line 19 - "$-(CZ_1Z_2-CZ_3Z_4-$" should read $\quad -- -(CZ_1Z_2-CZ_3Z_4)- --$ ;

Col. 19, line 23 - "$-(CX_1X_2-CX_3X_4-$" should read $\quad -- -(CX_1X_2-CX_3X_4)- --$ ;

Col. 21, line 4 - after "$R_1$" insert -- and $R_2$ --.

Signed and sealed this 10th day of June 1975.

(SEAL)
Attest:

RUTH C. MASON
Attesting Officer

C. MARSHALL DANN
Commissioner of Patents
and Trademarks